(12) United States Patent
Tsfaty

(10) Patent No.: US 8,854,985 B2
(45) Date of Patent: Oct. 7, 2014

(54) SYSTEM AND METHOD FOR USING ULTRASONIC COMMUNICATION

(76) Inventor: Yossef Tsfaty, Rishon Le Zion (IL)

( * ) Notice: Subject to any disclaimer, the term of this patent is extended or adjusted under 35 U.S.C. 154(b) by 446 days.

(21) Appl. No.: 13/175,790

(22) Filed: Jul. 1, 2011

(65) Prior Publication Data

US 2012/0171963 A1 Jul. 5, 2012

Related U.S. Application Data

(60) Provisional application No. 61/428,907, filed on Dec. 31, 2010.

(51) Int. Cl.
*H04B 11/00* (2006.01)
*H04W 4/00* (2009.01)

(52) U.S. Cl.
CPC ...................................... *H04B 11/00* (2013.01)
USPC ........... 370/247; 455/118; 455/131; 455/403; 455/523

(58) Field of Classification Search
CPC ........... H04B 11/00; H04B 2203/5458; G06K 2017/0045; G06F 3/043; H04R 2420/07; H04R 5/02
USPC .............. 370/247; 455/41.3, 523, 127.1, 403, 455/151.2, 567, 569.1
See application file for complete search history.

(56) References Cited

U.S. PATENT DOCUMENTS

| | | | | |
|---|---|---|---|---|
| 4,129,886 | A * | 12/1978 | Shih | 455/151.2 |
| 6,363,139 | B1 * | 3/2002 | Zurek et al. | 379/56.1 |
| 6,459,989 | B1 * | 10/2002 | Kirkpatrick et al. | 701/470 |
| 2004/0209654 | A1 * | 10/2004 | Cheung et al. | 455/567 |
| 2005/0159185 | A1 * | 7/2005 | Hiramatsu | 455/560 |
| 2007/0178943 | A1 * | 8/2007 | Na | 455/569.1 |
| 2008/0280566 | A1 * | 11/2008 | Yen et al. | 455/67.11 |

* cited by examiner

*Primary Examiner* — Andrew Chriss
*Assistant Examiner* — Romani Ohri
(74) *Attorney, Agent, or Firm* — ARC IP Law, PC; Joseph J. Mayo

(57) ABSTRACT

A system for wireless communication using ultrasonic signals that includes a transmission module, which receives input signals from a wireless device, modifies the received input signals in a manner that converts each received input signal into a corresponding ultrasonic signal and wirelessly transmits each said ultrasonic signal over an ultrasonic link, and a receiving module, which receives the transmitted ultrasonic signals, recovers the corresponding input signals therefrom and enables outputting each respective input signal through one or more output devices. Modification of the input signals may include compressing, encoding and modulating the input signals. The input signals may be voice audio signals for enabling to use the system for supporting phone calls by enabling ultrasonic communication between for instance, a wireless headset and a mobile phone. Transmission and receiving modules may be associated with a wireless headset and mobile phone for allowing ultrasonic and optionally RF communication therebetween.

22 Claims, 11 Drawing Sheets

SYSTEM AND METHOD FOR USING ULTRASONIC COMMUNICATION

CROSS-REFERENCE TO RELATED APPLICATIONS

This application claims the benefit of Provisional patent application No. 61/428,907 filed on Dec. 31, 2010, which is incorporated herein by reference in its entirety.

BACKGROUND OF THE INVENTION

1. Field of the Invention

The present invention generally relates to communication systems and methods and more particularly to communication systems based on ultrasonic signals and methods for short-range communication using ultrasonic signals.

2. Description of the Related Art

Radio Frequency (RF) transmission is used by wireless communication technologies at different frequencies for carrying information by means of modulating an RF signal with the information to be transmitted. Typical frequencies used in wireless communication are in the range of 0.1 GHz-10 GHz, but some applications may extend below or above this range. Techniques for carrying the information over an RF signal include various digital modulation schemes, as well as analog modulation schemes.

Independently of the RF frequency used and the modulation scheme employed, all these technologies and appliances inherently rely on electromagnetic radiation for their operation and wireless communication functions. Therefore, essentially all consumer devices that contain wireless communication functionality emit electromagnetic radiation.

In recent years there is a growing awareness to health hazards related to exposure to radiation emitted from commonly used devices such as cellular phones, cellular modems and other wireless devices. Since there has been an enormous increase in usage of these devices more and more studies are being conducted some yielding quite alarming results and conclusions.

The relation between health related hazards and electromagnetic radiation is and continues to be the subject of extensive research and scientific/medical expert concern. Many studies carried out over the recent years show direct and/or indirect relation between health risks and exposure to electromagnetic radiation emitted by wireless devices such as mobile phones. Most studies show that health risk increases in proportion to factors such as radiation level and exposure duration.

Many appliances related to mobile devices that connect to the mobile device and allow outputting and inputting voice and other related data therefrom such as wireless headsets for mobile phones, do not reduce radiation exposure and/or emission and in some cases even increase health risk by directing more of the emitted radiation towards the user's head.

An Israeli company called "Intelligo" has published a product (see: http://www.globes.co.il/news/article.aspx?did=1000640560) that enables using ultrasonic communication for transmitting data from cellular phones to specially designed end devices using a designated application uploaded on the cellular phone. This communication link is specifically designed for transmitting data from a mobile phone application to a designated children electronic toy using ultrasonic communication. This company does not allow reducing exposure to electromagnetic radiation while using the cellular phone as a long-distance communication device for conducting phone-calls and-or for sending/receiving text messages and the like.

BRIEF SUMMARY OF INVENTION

According to some embodiments of the present invention, a system for wireless communication is provided using ultrasonic signals that includes at least one transmission module, which receives input signals from a wireless device, modifies the received input signals in a manner that converts each received input signal into a corresponding ultrasonic signal and wirelessly transmits each ultrasonic signal over an ultrasonic link, and a receiving module, which receives the transmitted ultrasonic signals, recovers the corresponding input signals therefrom and enables outputting each respective input signal through one or more output devices. Modification of the input signals may include compressing, encoding and modulating of the input signals.

The input signals may be any signals known in the art that include any type of data such as media data (voice, video, text, etc.). For example, the system supports voice audio signals to allow the system to support phone calls communication by receiving audio signals, converting them into ultrasonic signals by modifying them and allowing receiving the ultrasonic signals, recovering the audio signals corresponding therefrom and enabling outputting the recovered audio signals either by using one or more audio output devices such as speaker(s) that are embedded in the receiving module and/or by using external output devices.

According to some embodiments, the transmission module comprises at least one ultrasonic transmitter for enabling to transmit ultrasonic signals. The transmission module is further operatively associated with at least one audio receiving device of said wireless device for receiving the audio input signals to allow bi-directional communications. Additionally, the receiving module comprises at least one ultrasonic receiver for receiving the ultrasonic signals transmitted from the transmission module, where the receiving module is operatively associated with at least one audio output device for outputting the audio signals to allow bi-directional communication.

According to some embodiments, the transmission module comprises a data encoder configured to compress and encode the input signal; a modulator, connected to the data encoder, configured to digitally modulate the encoded signal outputted by the data encoder, according to a predefined modulation technique; at least one digital to analog converter, connected to the modulator, configured to convert the digitally modulated signal into an analog ultrasonic signal; and an output unit, connected to the digital to analog converter, configured to transmit the ultrasonic signal wirelessly. Respectively, the receiving module comprises: a receiver capable of sensing ultrasonic signals; an analog to digital converter connected to an input unit used to convert each received ultrasonic signal into a corresponding digital signal; a demodulator configured to demodulate digital signals outputted by the analog to digital converter; a data decoder, connected to the demodulator, configured to decode and decompress each digital signal to obtain a decoded signal corresponding to a respective input signal associated therewith; and an output device, configured to output the decoded signal.

The output unit may comprise at least one of: a speaker and/or a piezoelectric device enabling to output ultrasonic signals, and the receiver may comprise at least one of: a microphone and/or a detector enabling to detect ultrasonic signals.

The modulation technique may include at least one of: single-carrier modulation, multicarrier modulation or any other signal modulation known in the art. For example, the multicarrier modulation may include one or a combination of an orthogonal frequency division multiple-access (OFDM/OFDMA) technique, code division multiple-access (CDMA), time division multiple-access (TDMA) and the like. The modulation may additionally or alternatively include data protection using at least one of: forward error correction (FEC) techniques, scrambling based techniques and/or data interleaving based techniques.

According to some embodiments, at least part of the modification of each input signals is carried out by a software application operated by the wireless device, where the application may be, for example, a client application, a web application and the like.

According to some embodiments of the present invention, the transmission module further enables transmitting signals over at least one RF link to the receiving module and respectively, the receiving module enables receiving signals over said RF link in addition to their ability to transmit and receive ultrasonic signals.

Optionally, the transmission module comprises an ultrasonic transmission unit for enabling to carry out the receiving of input signals, modification and conversion thereof into ultrasonic signals and transmission of the ultrasonic signals; an RF transmission unit which enables receiving input signals and modifying them in a manner that enables converting each received input signal into an RF signal and transmission of each the RF signal over the RF link; a module, which enables identifying a current ultrasonic communication link status, wherein upon identification of a low communication status, said transmission module, enables operating said RF transmission unit for using RF communication when the ultrasonic communication link is poor. Respectively, the receiving module comprises: an ultrasonic receiving unit, which enables receiving transmitted ultrasonic signals and extracting input signals associated therewith for outputting of the input signals; and an RF receiving unit, which enables receiving transmitted RF signals and extracting input signals associated therewith for outputting of the recovered input signals.

According to some embodiments of the present invention, a wireless headset may be operatively associated with a first transmission module and a wireless mobile device may be operatively associated with a second receiving module for enabling using the ultrasonic communication between the wireless headset and the mobile wireless device for transmitting and receiving of data by using said RF communication or the ultrasonic communication for transmitting data from the wireless mobile device to the wireless headset and the ultrasonic communication for transmitting data from the wireless headset to the wireless mobile device. The headset may be based on Bluetooth technology wherein the first transmission and receiving modules are embedded therein and the Bluetooth link may be used for service discovery and connection establishment and maintenance, using Bluetooth protocols.

Optionally, the transmission module enables receiving and transmitting of modulated RF input signals that carry data over a long range RF link from at least one wireless communication network station, modify the received input signals to output and transmit corresponding ultrasonic signals to the receiving module and modifying the received ultrasonic signal from the mobile wireless device to RF signal to be transmitted over the long range RF link to the wireless communication network station. Respectively, the receiving module may be operatively associated with a mobile wireless device enabling to receive the ultrasonic signals or said RF signals from the transmission module and use data output abilities of the mobile wireless device to output data corresponding to the input signals. The system may further comprise an interfacing device enabling to connect to the receiving module and to the mobile wireless device for interfacing them to one another.

Optionally, the receiving module is connected to a wireless headset wherein the transmission module enables outputting data over the RF link while outputting the ultrasonic signals to enable establishing, authenticating and maintaining communication with the wireless headset via the RF link and outputting audio signals corresponding to the input signals via at least one audio output device of the wireless headset. The wireless headset may be a Bluetooth based headset wherein the receiving module is embedded in the wireless headset.

According to some embodiments, the wireless communication device includes at least one of: a personal digital assistance (PDA) device, a laptop, a tablet computer, a cellular phone, a cellular Smartphone, or a cellular modem, and the output device comprises at least one of: a wireless headset, a wireless speaker.

According to some embodiments of the present invention, there is provided a method of wireless communication using ultrasonic signals. The method may include: receiving input signals from at least one predefined wireless device, using a transmission module; modifying the received input signals in a manner that converts each received input signal into an ultrasonic signal, wherein the modification includes modulation of the input signals; wirelessly transmitting the respective ultrasonic signal over an ultrasonic link; receiving the transmitted ultrasonic signal, using a receiving module; recovering the input signals from the ultrasonic signals; and enabling outputting each respective input signal through an output device.

The method may additionally include identifying other systems using ultrasonic communication in a close environment and characteristics of the ultrasonic signals they are using and modifying the input signals according to the input signal characteristics and according to the identified characteristics, thereby enabling to produce distinguishable ultrasonic signals.

According to additional or alternative embodiments of the present invention, there is provided a system for wireless communication using ultrasonic signals comprising: (i) a first and a second transmission modules each enables receiving input signals from at least one predefined wireless communication link, modifying the received input signals in a manner that converts each received input signal into a corresponding ultrasonic signal and wirelessly transmitting each the ultrasonic signal over an ultrasonic link, the modification includes signal modulation; (ii) a first and a second receiving modules, each enables receiving the transmitted ultrasonic signals, recovering the corresponding input signals from the respective ultrasonic signals and outputting each the respective input signal; (iii) a station device comprising the first transmission and receiving modules, wherein the station device enables receiving ultrasonic signals from an ultrasonic link and converting them to a long range RF signals and transmitting the RF output signals to at least one remote cellular base station; and (iv) an interfacing module, which is operatively associated with a wireless device, the interfacing module comprises the second transmission and receiving module for enabling bidirectional communication between the station device and the wireless device associated therewith over the ultrasonic link.

The interfacing module may be embedded within the wireless device (which may be for instance a mobile phone) or a separate device connecting to the mobile phone such as a device designed as a mobile phone cover that can also connect thereto for enabling the ultrasonic and optionally also an RF communication.

DETAILED DESCRIPTION OF THE INVENTION

Figure 1:
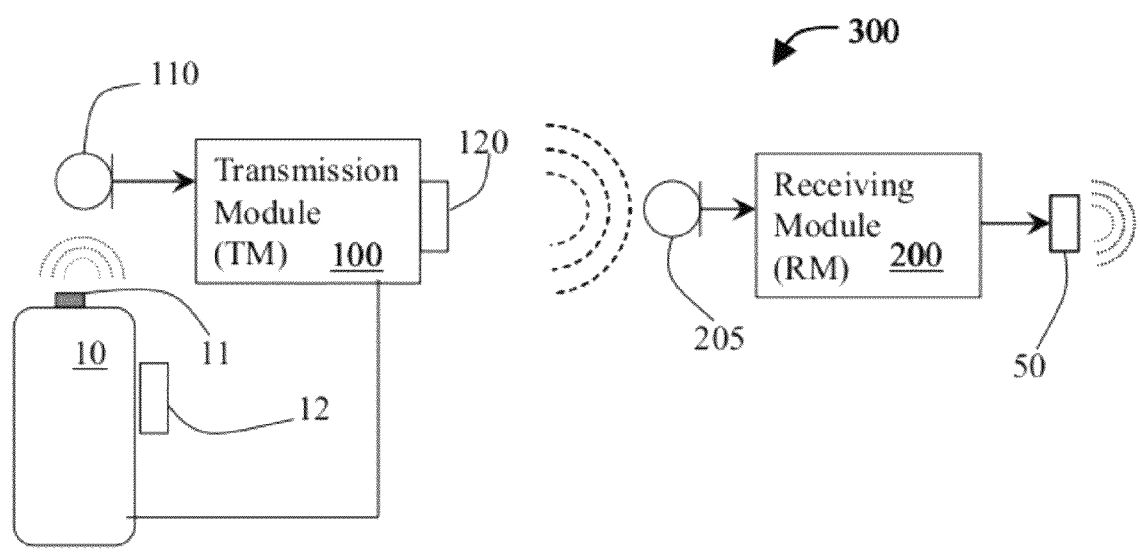
FIG. 1 shows a system for wireless communication using ultrasonic signals, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides methods and systems for using wireless communication that is based on ultrasonic signals, which are harmless sound waves. One main objective of this invention is to enable effective and noise free short-range ultrasonic communication for reducing or even annihilating the hazardous electromagnetic radiation a user is exposed to when using communication devices having wireless capabilities such as mobile phones and/or headsets, wireless modems and the like based on radio frequency (RF) communication.

According to some embodiments of the present invention, there is provided a system for reducing user's exposure to electromagnetic radiation such as RF based radiation when using a communication device by using ultrasonic signals for short-range communication. In some embodiments, the system includes a transmission module, operatively associated with a wireless system or device and a receiving module operatively associated with one or more output devices.

The transmission module enables receiving input signals from a wireless device such as a cellular phone, a wireless modem, a wireless headset and the like, modifying the received input signals in a manner that converts each received input signal into an ultrasonic signal, where the modification includes modulation of the input signals, and wirelessly transmitting each respective ultrasonic signal over an ultrasonic link to the receiving module. The receiving module, designed to be located remotely from the transmission module, enables receiving the transmitted ultrasonic signal and recovering the input signals from the ultrasonic signals for enabling using one or more output devices for outputting each respective recovered input signal there through.

The systems and methods allow a user to receive the data contained by the input signal such as an audio data, media data, or any other data type without risking in bringing his body or body parts such as his/her head in an endangering proximity to the wireless device that can emit electromagnetic radiation.

According to some embodiments of the present invention, the transmission module can receive audio input signals outputted by audio output devices of the wireless device such as one or more speakers of a cellular phone wireless device. In these embodiments, each audio input signal is modified to be converted into a corresponding ultrasonic signal containing the information required for the receiving module to recover the audio signal therefrom. The recovered audio input signal is then outputted by one or more output devices such as speaker(s) of a headset associated with the wireless device.

The ultrasonic signals are wirelessly propagated through any one or more mediums such as air, walls, doors, etc. referred to in this document as the ultrasonic link.

The ultrasonic signals are outputted by one or more ultrasonic output devices such as speakers and/or piezoelectric devices that can output ultrasonic signals within a specific predefined range defined in the system. Respectively, the receiving module includes or is associated with one or more receivers such as piezoelectric devices and/or microphones that can receive ultrasonic signals of the same range.

The ultrasonic range defined in the system may be, for example, between 20-100 KHz especially yet not exclusively in cases in which the system receives and modifies audio input signals. This allows using the same audio output devices such as piezoelectric devices and/or speakers for outputting both audio and ultrasonic signals since some of those devices can typically output both audio signals range up to about 20 KHz and ultrasonic signals range up to 100 KHz. In this way the transmission module can use, for example, the speaker(s) of the wireless device for outputting the ultrasonic signals.

According to some embodiments of the present invention, the transmission and/or the receiving module further enable transmitting signals over one or more RF links to the receiving module and the receiving module, respectively, enables receiving those RF signals over the RF link. These RF communication abilities may be added to the system for adding at least one of the following functions: (i) to allow switching to an RF communication when the system detects poor ultrasonic communication (e.g. due to noise or any other internal or external disturbances) in which case a low RF signals may be used; and/or (ii) for allowing the transmission module to receive long/short range RF signals from external communication stations and/or devices. In the second option high (long range) RF link and signals may be used to allow, for example, receiving audio and/or communication data from a distance wireless communication network (such as a mobile phone network) using the user's mobile phone only as an output device by blocking and/or disabling its RF communication abilities (e.g. reception and/or transmission). This will allow, for example, to receive audio signals of phone calls from the cellular network antenna station directly by the transmission module, transmitting ultrasonic signals corresponding to the received audio signals, receiving the ultrasonic signals and recovering the audio signals by the receiving module connected to or embedded in the mobile phone and using the mobile phone speakers, for example, for outputting the audio signals. This will allow the user to avoid RF radiation exposure when placing the mobile phone in proximity to his body or head for receiving and conducting calls there through.

Reference is now made to FIG. 1, which schematically illustrates a short-range ultrasonic communication system 300, according to some embodiments of the present invention. System 300 includes a transmission module 100 and a receiving module 200. Transmission module 100 enables receiving audio input signals from an output device such as from a speaker 11 of one or more wireless devices such as a mobile phone 10 modify the input signal to convert the input audio signal into a corresponding ultrasonic signal and transmitting the ultrasonic signal through one or more ultrasonic output devices such as through a piezoelectric based receiver or a microphone 120, which is a part of transmission module 100 and/or through output devices of mobile phone 10 such as speaker 12 that enable outputting both audio and ultrasonic signals.

The audio signals are any acoustic signals that are within the human hearing frequency range (typically between 20 Hz to 20 KHz), where the ultrasonic signals are any acoustic signals that are above the upper limit of human hearing frequency range (above 20 KHz).

According to some embodiments of the present invention, as illustrated in FIG. 1, receiving module 200, which may be positioned at a distance from transmission module 100, enables receiving (detecting) ultrasonic signals outputted by transmission module 100 using one or more ultrasonic receivers 205 enabling to detect ultrasonic signals and recovering their corresponding audio input signals according to the modification thereof. Receiving module 200 further enables outputting the recovered audio signals by using one or more external audio output devices such an earphone headset 220 including audio receiver(s) such as a microphone and audio output devices such as earphone speaker (s) and/or by using an audio output device that is a component of receiving module 200.

For example, receiving module 200 or components thereof may be embedded in a wireless headset to enable the wireless headset to receive audio signals via harmless ultrasonic communication to output the audio signals thereby without requiring the commonly used hazardous RF based communication between the mobile phone and the wireless headset. This will allow the user to keep his/her mobile phone in a much safer distance from his/her body/head when conducting a phone conversation, while the only wireless communication between the mobile phone and the headset is ultrasonic and much less or utterly harmful.

Transmission module 100 may include software and/or hardware components for carrying out functions such as modification of the input signals, where functions such as transmitting the corresponding ultrasonic signals may be carried out by hardware components such as via speakers, piezoelectric based output devices, etc. For example, a software application operated by the wireless device may carry out functions such as receiving data representative of the input signal, encoding the input signal, modifying the signal by processing the data outputting a data packet that is representative of a corresponding conversion of the input signal into an ultrasonic signal, carry out data analysis on the input signal for identification of its characteristics and quality, and the like. The software component(s) of transmission module 100 may be processed by processor(s) of the wireless device it is associated with and/or by one or more designated processors which are components of transmission module 100.

Receiving module 200 may include software and/or hardware components as well, where some hardware components may be mandatory such as at least one receiver, which can detect the ultrasonic signals, and the like. Software components may be used for recovering the input signals from the received ultrasonic signals using data analysis techniques that correspond to the known manner in which the input signals have been modified by transmission module 100.

According to some embodiments, transmission module 100 implements ultrasonic transmission of digital data and/or audio (voice) signals, in air and/or any other medium, using the ultrasonic frequency band in the range of 20 KHz-1 MHz and may carry data rates of up to 1 Mbps over distances of up to 50 meters in free air. The available ultrasonic frequency range (e.g. 20 KHz-1 MHz) can be divided into smaller bands, where each ultrasonic transmission session can use one or more bands, based on channel conditions, noise, required information capacity, and co-existence with other ultrasonic links operating in close proximity. In these cases, transmission module 100 is configured to check ultrasonic communication status every predefined time period and allocate an ultrasonic frequency band in each transmission session accordingly, where receiving module 200 is able to distinguish the characteristic of the ultrasonic signal that relate to the corresponding input signal and those relating to the band allocation.

Modulation of the input and/or coded signal can be based on multi-carrier scheme such as orthogonal frequency division Multiplexing/multiple-access (OFDM/OFDMA) of a single carrier scheme such as phase/frequency shift keying (PSK/FSK), quadrature amplitude modulation (QAM) and the like. Modulation spectral efficiency can be adaptively set at any value within a predetermined range such as the range of 0.5 bit/sec/Hz-8 bit/sec/Hz depending on measured channel conditions. In the case of multi-carrier modulation the modulation spectral efficiency can be adaptively set for each modulated carrier independently of other tones. Such adaptive spectral efficiency can be determined upon initial establishment of communication between the ultrasonic transmitter and ultrasonic receiver, and/or can be continuously updated, all based on feedback from the ultrasonic receiver sent to the ultrasonic transmission module via a control channel.

According to another embodiment, multiple-access schemes can be employed on top or as part of the basic information-carrying modulation, in order to allow co-existence of concurrent ultrasonic communication channels in close physical proximity. Such multiple access schemes can include code division multiple-access (CDMA), OFDMA, time division multiple-access (TDMA) or any other scheme and/or combinations thereof that are known in the art.

According to some embodiments, transmission module 100 implements coding and optional interleaving in order to assure the performance of the ultrasonic communication link between the transmission module 100 and receiving module 200. Additionally or alternatively, convolution codes, turbo codes and Reed-Solomon codes can be used in combination or independently in order to achieve a desired performance level.

Figure 2A:
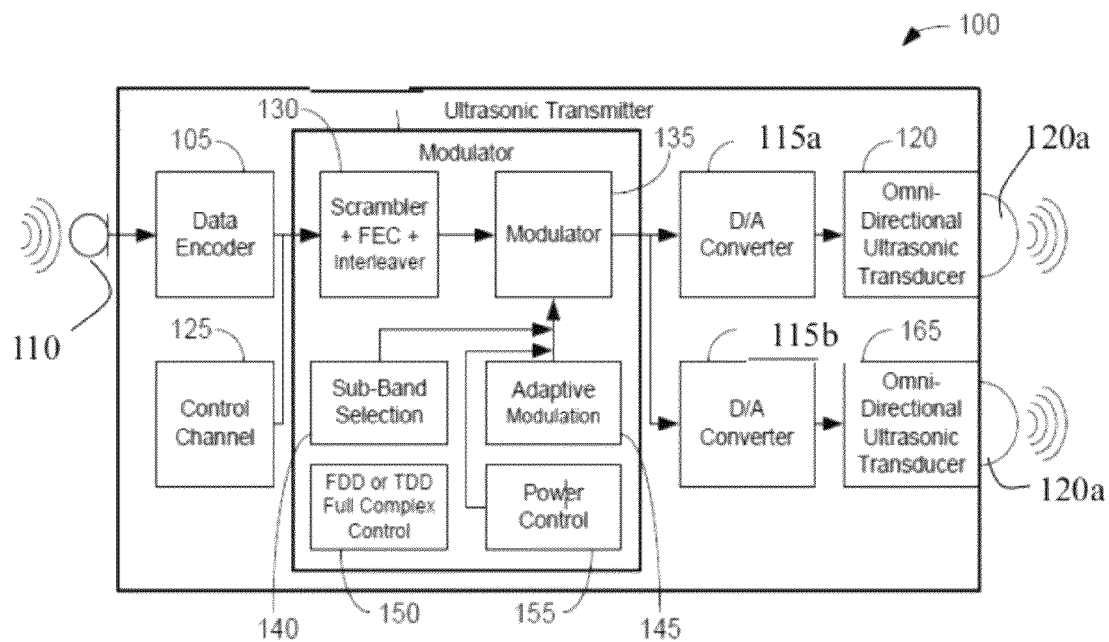
FIG. 2A shows a transmission module configuration for the ultrasonic communication system, according to some embodiments of the present invention.
Figure 2B:
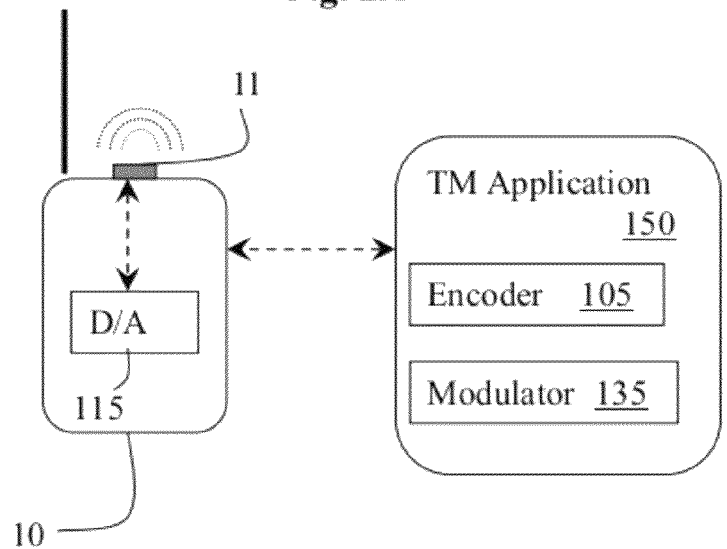
FIG. 2B shows a transmission module including a software application, according to some embodiments of the present invention.

Reference is now made to FIG. 2A, which schematically illustrates a configuration of transmission module 100, according to some embodiments of the present invention. According to those embodiments, transmission module 100 connects to audio receiver 110 (e.g. a microphone) for receiving audio input signals and comprises: a data encoder 105, a modulator 135, connected to data encoder 105, one or more digital to analog (D/A) converters such as D/A converters 154a and 154b, connected to the modulator 105 and a transducers 165a and 165b, connected to the digital to analog converters 115a and 115b. According to some embodiments of the present invention, TM application 150 may be based on one or more digital signal processing (DSP) methods for enabling signal processing of the input signal.

The components of transmission module 100 enable and improve transmission performances of ultrasonic signals under severe multipath channel conditions which are typical of acoustic channels. According to one embodiment, transmission module 100 employs an error detection scheme such as cyclic redundancy check (CRC) schemes, on each of the transmitted signals. Such error detection information can be used for re-transmission of erroneous information signals and/or to improve voice decoding by receiving module 200.

Data encoder 105 is configured to encode and/or compress each input signal. The output of data encoder 105 is manipulated by a control channel unit 125. In applications where audio signals representing voice data are to be transmitted over the ultrasonic link, each audio signal is coded using a data encoder 105 such as a voice coder (vocoder) into a digital stream at a rate of 4-64 Kbps. This digital stream is fed into digital modulator 135 for transmission over the ultrasonic link. The vocoder can be of several types (e.g., code-excited linear prediction (CELP)) in order to achieve high quality and robust voice quality in varying channel conditions.

The modulator 135 is configured to digitally modulate an ultrasonic signal with the input signal (which may be audio according to our example). According to one embodiment, transmission module 100 additionally includes a unit 130 that may include at least one of: a scrambler, forward error correction (FEC) and an Interleaver, a sub-band selection unit 140, an adaptive modulation unit 145, a full complex control unit 150, and a power control unit 155. The scrambler may be used to random the data and make the transmitted frequency spectrum "flat" and hence spread the transmitted information equally across the spectrum. The forward error correction (FEC) may be used protect the transmitted information bits by adding additional data bits derived by the information bits to provide immunity against impairments and interferences that may occur during the transmission over the link. In the receiving side, a FEC decoder is implemented to extract the information by using the extra protection bits. The Interleaver may be used to spread the transmitted information bits in a random manner across time. When doing so, in the event of a received burst noise (that may harm few consecutive bits), at the output of the de-interleaver (in the receiving side), the error will be spread across time thereby allowing the FEC decoder to correct each error.

Transmission module 100 can employ transmission power control based on feedback received from the ultrasonic receiving module 200 according to a received/measured Signal to Noise Ratio (SNR), thus optimizing the transmission power in respect to the channel conditions, thereby minimizing potential interference to other co-existing ultrasonic channels and minimizing power consumption of transmission.

Each D/A converter 115a and/or 115b is configured to convert the digitally modulated signal into an analog signal.

Each transducer 120a and/or 120b is configured to convert the analog signal to an ultrasonic signal and transmit the ultrasonic signal via air. According to one embodiment, transducers 120a and 120b are ultrasonic transducers that can use one or more technologies such as micro-electromechanical systems (MEMS) based technology, piezoelectric technology, or any other technology that can convert an electrical signal into an acoustic signal at the desired ultrasonic frequency range.

The input and/or outputted ultrasonic signals may also be amplified by one or more amplifiers before outputted by transmission module 100 and/or before being processed by receiving module 200.

Reference is now made to FIG. 2A, schematically illustrating a combined software-hardware transmission module 100 having some components thereof such as encoder 105 and modulator 135 are software components of a software transmission module (TM) application 150 operated by wireless device 10, while other components of the transmission module 100 are hardware components such as D/A converter 115 (similar in configuration and functionality to converters 115a and/or 115b). This will allow using any simple wireless communication device such as mobile phones, laptops and the like without requiring installation of any particular hardware using, for instance D/A converters, speakers and microphones already provided as part of the wireless device while enabling the ultrasonic communication functionalities by installing/uploading a designated TM application 150. The TM application 150 may be any computer program(s) such as a web application, a client application or any other form of a software component/tool that can be operated by the wireless device.

Figure 3:
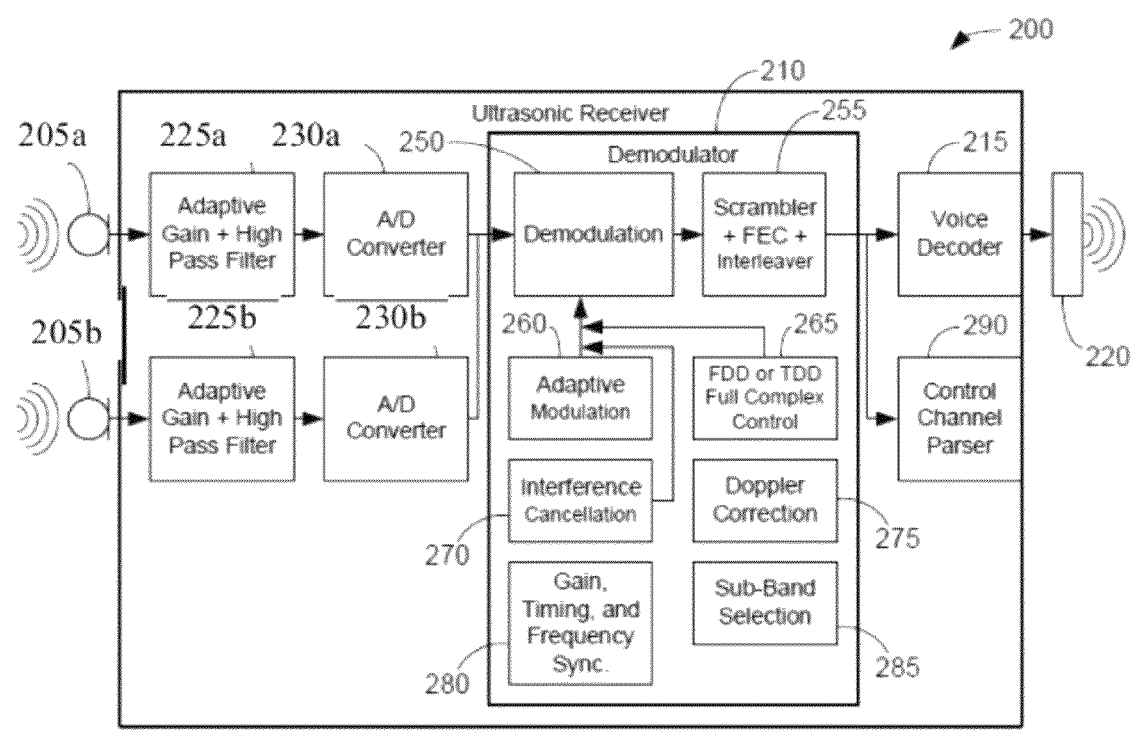
FIG. 3 shows a receiving module configuration for the ultrasonic communication system, according to some embodiments of the present invention.

Reference is now made to FIG. 3, which schematically illustrates a receiving module 200, according to some embodiments of the present invention. According to these embodiments, receiving module 200 includes one or more receivers such as receivers 205a and 205b capable of sensing ultrasonic acoustic signals, a demodulator 210, a data decoder 215, connected to demodulator 210 and an output device 220 (e.g. an audio output device such as a speaker in case the ultrasonic signals represent audio signals (voice)), configured to output the decoded signal.

According to some embodiments of the present invention, the ultrasonic communication between transmission module 100 and receiving module 200 can go in both directions, meaning that receiving module 200 is able to transmit data such as a feedback data to transmission module 100 via the ultrasonic link and/or any other additional links capable by system 300. The feedback may be used for the purpose of optimizing the transmission parameters, where the feedback data can include modulation parameters, spectral efficiency, sub-band frequency to be used, transmitted power per band/sub-band/sub-carrier, and the like. Receiving module 200 can employ signal quality and signal-to-noise estimation techniques and send such information as a feedback to transmission module 100 to allow transmission module 100 to use this data for improving its performances by, for example, providing it with optimal transmission and modulation parameters accordingly.

Each receiver 205a and/or 205b is configured to receive and convert a received ultrasonic signal into an analog signal. In some embodiments, in which transducer 205a and 205b are microphones based on MEMS technology, piezoelectric technology, or any other technology for converting acoustic ultrasonic signals into electrical signals, and operating at the desired ultrasonic frequency range.

Receiving module 200 may additionally include filters 225a and 225b connected to receivers 205a and 205b, respectively, and analog to digital (A/D) converters 230a and 230b each, as shown in FIG. 3, connected between a respective receiver 20a/205b5 and demodulator 210. According to some embodiments of the present invention the output of second A/D converter 230b is used for modifying the output of the first A/D converter 230a by providing another receive path and allowing for diversity reception to be carried in the demodulation process. This may allow improving the link quality in case one microphone is blocked while the other is not. Data decoder 215 may be configured to decode the digital signal to obtain a decoded signal that is substantially the same as the input signal originally inputted to transmission unit 100. The decoded signal is then outputted by an output device 220 (e.g., a speaker).

Demodulator 210 is configured to receive the converted digital signal and convert it back to a decoded signal (e.g. a decoded audio signal) or to the original input signal by using demodulation techniques that are reversed to the modulation techniques used by transmission module 100. As illustrated in FIG. 3, demodulator 210 may include: (i) a unit 255 that includes at least one of: a de-scrambler, an FEC decoder and a De-Interleaver reversing each respective modulation done by unit 130 of transmission module 100, (ii) a demodulator unit 250, (iii) an adaptive modulation unit 260, (iv) a full complex control unit 265, (v) an interference cancellation unit 270, (vi) a Doppler correction unit 275, (vii) a synchronization unit 280 and (viii) a sub-band selection unit 285. The de-interleaver is used to re-order the received bits in order to provide the information and protection bits to the FEC decoder in the same order as was provided by transmission module 100. The FEC-decoder uses the protection bits added by the FEC encoder at the transmission module 100 side to recover the original information bits and correct most of the bit error that may occur during the transmission over the ultrasonic or RF link. The de-scrambler is used to remove the scrambling code applied at transmission module 100 (in order to provide frequency flatness).

Optionally, a control channel parser 290 receives an output from demodulator 210. Receiving module may 200 employ synchronization algorithms to synchronize with the received ultrasonic signal's timing, phase, and frequency, and then employ demodulation algorithms to optimally recover information data of the original input signal. Receiving module 200 may also employ an interference cancellation scheme to improve the reception quality under ultrasonic acoustic noise conditions.

Figure 4:
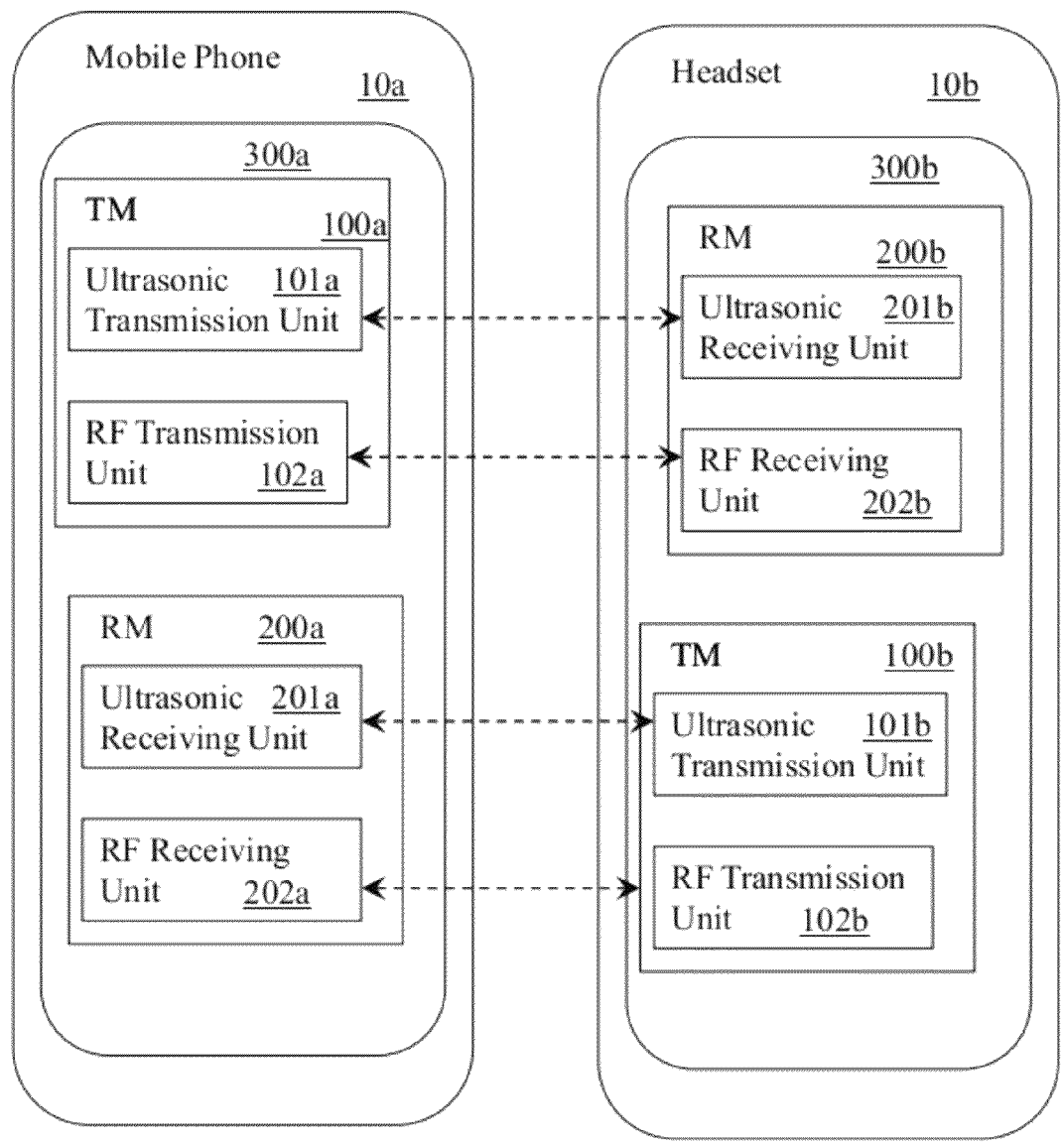
FIG. 4 shows a system for wireless communication using ultrasonic and RF signals, according to additional or alternative embodiments of the present invention.

Reference is now made to FIG. 4, which schematically illustrates a mobile phone wireless device 10a having a first ultrasonic communication system 300a installed thereto and a wireless headset 10b having a second ultrasonic communication system 300b installed thereto, enabling both ultrasonic and low (short-range) RF communication there between, according to some embodiments of the present invention. Each system of 300a and 300b respectively includes one transmission module 100a/100b and one receiving module 200a/200b. Transmission module 100a/100b, according to these embodiments, includes an ultrasonic transmission unit 101a/101b and an RF transmission unit 102a/102b and receiving module 200a/200b includes an ultrasonic receiving unit 201a/201b and an RF receiving unit 202a/202b.

Ultrasonic receiving unit 101a/101b is configured to allow receiving an input signal, modifying it and thereby converting it into a corresponding ultrasonic signal and transmitting each such ultrasonic signal to the ultrasonic receiving unit 201a/201b through the ultrasonic link. The ultrasonic receiving unit 201a/201b, respectively, receives each ultrasonic signal recovers the input signal therefrom by demodulating it and allows outputting the input signal through, for example, audio output devices of mobile phone 10a and/or headset 10b.

Having both receiving module 200a/200b and transmitting module 100a/100b in each wireless device 10a/10b, respectively, allows various communication capabilities that will allow reducing RF radiation exposure while still using low RF radiation for improving some aspects of the communication between devices 10a and 10b. For example, this configuration may enable (1) switching to RF communication when ultrasonic communication conditions are poor (such as high signal to noise ratio); (2) since wireless headset 10b is closer to the user's head when used, RF communication may only be used for transmission of data by wireless headset 10b to allow establishing and authenticating communication with mobile phone 10a and/or for receiving all data therefrom, while only ultrasonic communication may be used for receiving of data from mobile phone 10a by wireless headset 10b.

Figure 5:
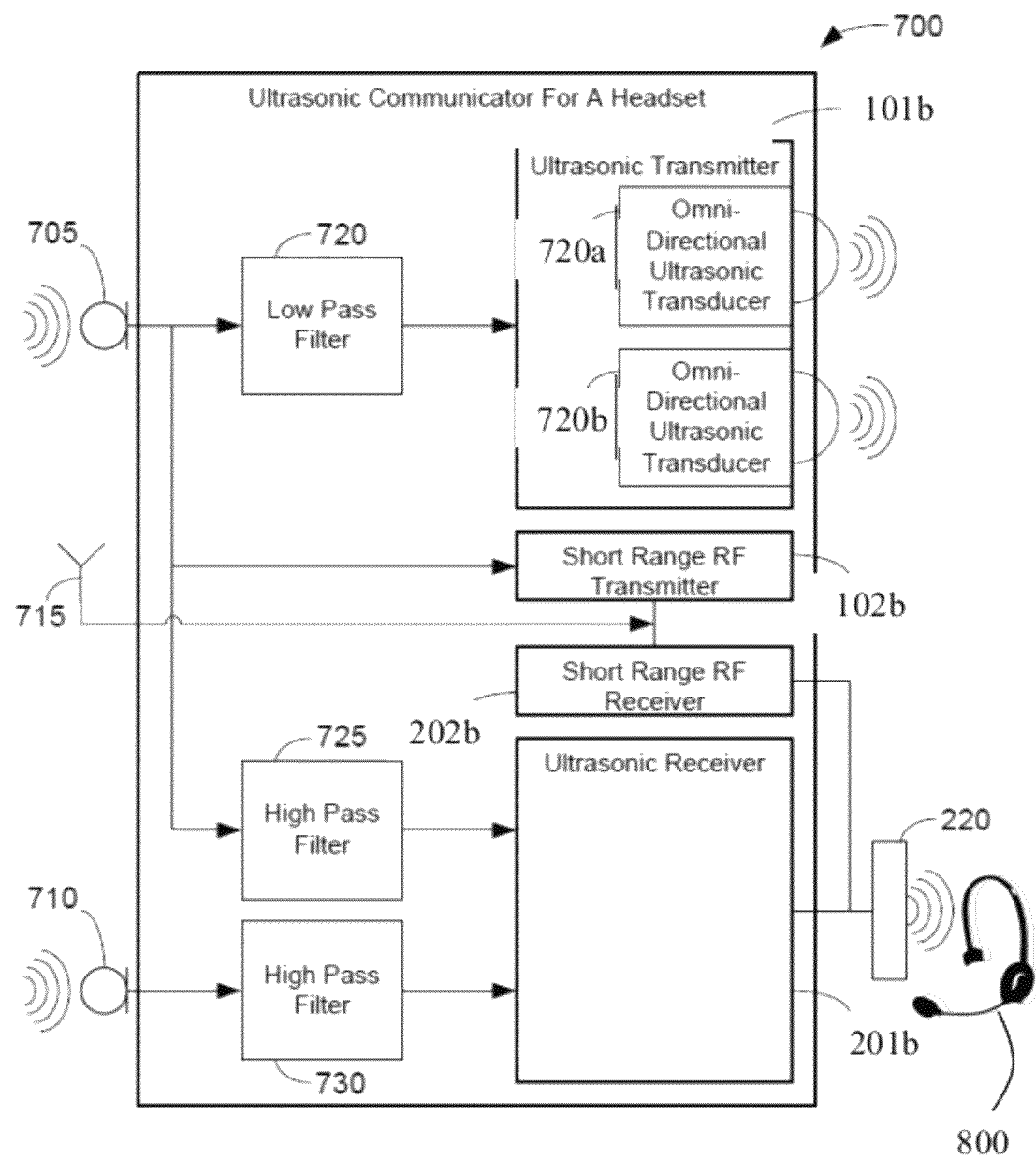
FIG. 5 shows a headset communicator, according to some embodiments of the present invention.
Figure 6:
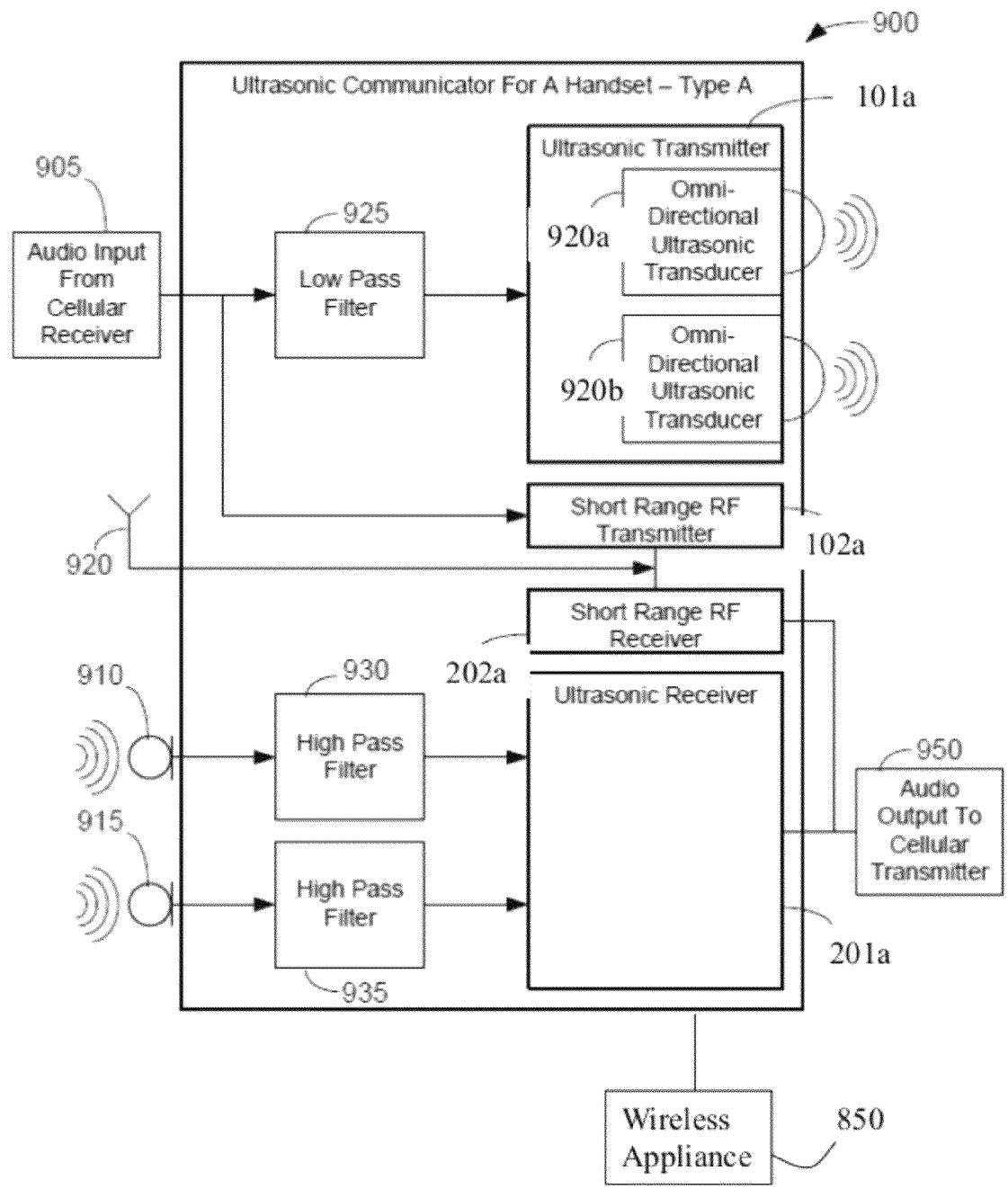
FIG. 6 shows a handset communicator, according to some embodiments of the present invention.

Reference is now made to FIGS. 5-6, which schematically illustrate possible configurations of a wireless headset system referred to as a headset communicator 700 and of a wireless handset system referred to as handset communicator 900, respectively, according to some embodiments of the present invention.

Headset communicator 700 includes ultrasonic transmission unit 101b and receiving unit 201b and RF transmission unit 102b and receiving unit 202b. Additionally, headset communicator includes one or more ultrasonic transducers such as transducers 720a and 720b and 220, one or more ultrasonic and/or audio receivers such as receivers 705 and 710 and a radio frequency (RF) antenna 715 for transmitting and receiving radio signals. Receiver 710 may be a microphone for receiving both audio and ultrasonic signals providing input to the ultrasonic receiving unit 201b, where receiver 705 may provide input to the ultrasonic transmission unit 101b.

A low pass filter 720 may be used to extract the audio (voice band) signals from the microphone receiver 705 and provide these audio signals to the ultrasonic transmission unit 101b where a high pass filter 725 may connect same microphone receiver 705 with ultrasonic receiving unit 201b. Another high pass filter 730 may be use for transmitting data to ultrasonic receiving unit 201b connecting to a second ultrasonic receiver 710 for allowing multiplying the number of receivers from which the ultrasonic signals are received, for example, to increase the number of reception angles of ultrasonic signals and thereby improving the quality of the input signals.

Ultrasonic transmission unit 101b may be configured to digitally modulate an ultrasonic signal with the input audio signal captured via the microphone receiver 705 and ultrasonically transmit the modulated signal via air using transducers 720a and/or 720b.

Headset communicator 700 is operatively associated with one of more wireless headset appliances such as headset 800 and with a wireless device associated therewith such as a mobile phone for enabling ultrasonic communication between the headset and the wireless device.

Handset communicator 900 may be associated with a handset wireless appliance 850 such as a mobile phone, according to some embodiments of the present invention. Handset communicator 900 includes an audio input device 905, an ultrasonic transmission unit 101a, and an ultrasonic receiving unit 201a. According to some embodiments of the present invention, the handset appliance 850 operatively associated with handset communicator 900 and/or with headset communicator 700 can be a telephone handset, mobile phone, tablet computer, PDA or any other wireless device known in the art.

As shown in FIG. 6, handset communicator 900 may further include a first microphone 910 and preferably a second microphone 915 for providing audio input to the ultrasonic receiving unit 201a, an RF transmission unit 102a, an RF receiving unit 202a, an RF antenna 920 for transmitting and receiving radio signals, a low pass filter 925, one or more high pass filters 930 and an audio output device 950.

Ultrasonic transmission unit 101a is configured to digitally modulate an ultrasonic signal with the input audio signal captured via the audio input device 905 and ultrasonically transmit the modulated signal via air using transducers 920a and 920b. Additionally or alternatively, ultrasonic receiving unit 201a is configured to receive ultrasonic signals and use an output device 950 to output the converted audio signals.

A wireless headset 800 associated with headset communicator 700 may be configured to receive an incoming voice audio signal from the mobile phone appliance, using a wireless communication channel which can be ultrasonic via a microphone 710 and/or RF based (using a short range RF receiver 740) via the RF antenna 715. Ultrasonic receiving unit 201b may be configured to demodulate an ultrasonic signal received via the microphone 710 and extract a decoded signal from the ultrasonic signal for recovering the audio input signal.

The headset and/or the handset communicators 700 and/or 900 may be used in various manners. For example, headset communicator 700 may receive a voice audio signal through microphone 705 and transmit this audio signal over a wireless ultrasonic link to an appliance such as a cellular handset (e.g. mobile phone). The headset 800 may be any wireless device that is worn by the user in proximity to the user's head such as a wireless headset (e.g. Bluetooth based headset comprising an earphone and a microphone for receiving and outputting voice audio signals), and the like. The headset may enable using any one or more communication technologies or use only communication links and technologies enabled by headset communicator 700. For example, headset communicator 700 may be an embedded component of a Bluetooth based headset 800 using an RF link of the earphone only for establishing and authenticating communication with a mobile phone associated therewith. In this case the audio signals of phone calls are communicated only through the harmless ultrasonic link during most duration of the call, via headset communicator 700, while the initial establishment and authentication of communication is carried out using the Bluetooth RF link for a brief period of time. Additionally or alternatively, the low RF communication enabled by RF transmission and receiving units 102b and 202b may additionally or alternatively be used as a fallback communication option incase the ultrasonic link is week and/or disabled such as at time when the signal to noise ratio of the transmitted ultrasonic signals is detected as high by the transmission and/or receiving units 101b/201b.

Handset communicator 900, as shown in FIG. 6, may perform the main wireless communication functions between the handset appliance it is associated with (e.g. mobile phone) and a headset of the wireless appliance. Handset communicator 900 can be integrated into the handset appliance or implemented in a separate device interfacing the handset and handset communicator 900, using any interfacing/connection technology and type such as through a universal serial bus (USB) connection, proprietary vendor interface, wireless Bluetooth connection, or any other interface type and technology. If implemented in a separate device not integrated within the wireless appliance, such device can take the form of a separate dongle, stand-alone module, and/or a jacket device attached to the appliance as will be further elaborated in description of FIG. 7.

According to some embodiments of the present invention, a wireless headset with headset communicator 700 can be applied to communicate with a several types of wireless appliances, including but not limited to a mobile phone, a personal computer, laptop computer, handheld computer, tablet computer, and/or a music player device. In all such cases, the wireless headset transmits the voice signal (received through a microphone 705) towards the appliance 810, where it is received by an ultrasonic communicator for a handset 900. A voice and/or data signal provided by wireless appliance 810 may be transmitted back to wireless headset 800 by the handset communicator 900 and received at wireless headset 800 by headset communicator 700.

When only the ultrasonic communication is used for communication between headset 800 and wireless appliance 850, essentially all RF/electromagnetic radiation is eliminated from the headset 700. Furthermore, any potential interference to transmission from headset communicator 700 and any other RF-based wireless system is avoided.

Each of the above applications and embodiments may use bi-directional (full duplex) ultrasonic link, or an ultrasonic link in one direction and a short range RF link (e.g., Bluetooth, low power Bluetooth, or other) in the reverse direction (half duplex). In each of the above applications/embodiments, the half/full duplex ultrasonic link (from wireless headset 800 to wireless appliance 850 and optionally from wireless appliance 850 to headset 800 can optionally operate with a standby backup short range RF link (e.g. Bluetooth or other) which becomes active only if/when the ultrasonic link fails to operate satisfactorily.

The short range RF link which can be optionally included in headset communicator 700 and in handset communicator 900 may be used as a main or backup communication channel, as described above, and can include a standard Bluetooth link, a standard WiFi link, a standard digital enhanced cordless telecommunications (DECT) link, a low transmit power version of Bluetooth, or any one or more different standards or proprietary RF transmission technology capable of carrying the voice/data information between wireless headset 800 and wireless appliance 850. This short range RF link can use very low transmission power, for example, when using a voice coder to compress the voice audio signal before modulation. Once the audio signal is compressed and modulated, only low bit-rate are transmitted through the medium to the receiver which uses a voice decoder to decompress the voice signal. This will allow reduction of the transmitted power (since the sensitivity of the receiver side can improve due to the low bit rate of the information).

In embodiments requiring audio/voice input into the appliance containing the ultrasonic communication link functionality, the same microphone can be used to detect the audio/voice acoustic signal as well as the ultrasonic acoustic signal. The microphone output is split, with and optional split-filter (combination of High-pass and Low-pass filters), into the 0-20 KHz band (voice/audio range) which is typically fed into an audio processing module, and the >20 KHz band (ultrasonic range) which may be fed into ultrasonic receiving module 200a/200b.

Figure 7:
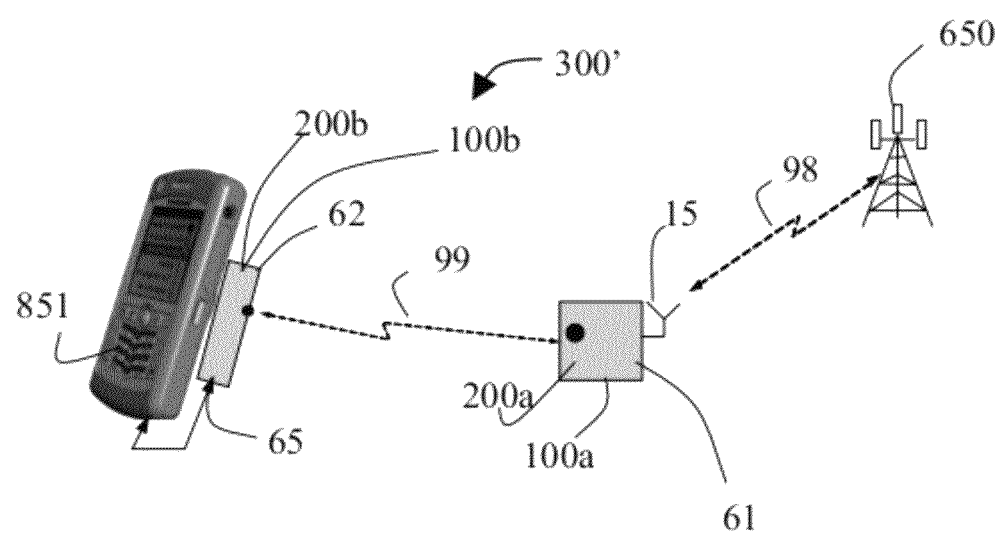
FIG. 7 shows a system for ultrasonic communication relay system, according to additional or alternative embodiments of the present invention.

Reference is now made to FIG. 7, which schematically illustrates a system 300' for using ultrasonic communication, according to other embodiments of the present invention. According to these embodiments, first transmission module 100a and receiving module 200a are operated by a station device 61.

Station device 61 may enable receiving and transmitting data through one or more wireless links such as RF link 98 to and optionally from one or more communication stations such as a cellular base station 650 for mobile phones using high-power designated RF communication band. First transmission module 100*a* enables receiving at least part of the data received from cellular base station 650 and may convert this data part into ultrasonic signals. These ultrasonic signals may then be transmitted to second receiving module 200*b* of interfacing module 62. Respectively, first receiving module 200*a* of station device 61 can receive and recover ultrasonic signals from second transmission module 100*b* of interfacing module 62. This will allow managing and enabling bidirectional communication between interfacing module 62 and station device 61, which eventually enables using harmless ultrasonic communication for communicating mobile phone 10 with cellular base station 650.

Second transmission and receiving modules 100*b* and 200*b* are operatively associated with mobile phone 10 by being embedded therein or by being connected thereto through interfacing module 62.

Station device 61 enables receiving data through the RF link 98 where the data relates to operations of mobile phone 10 such as phone calls data, messaging related data and the like. For these purposes station device 61 may include designated hardware (such as a SIM card and/or a cellular modem) for managing and controlling data communication and processing of data received from cellular base station 650. Station device 61 may enable receiving the data arriving from cellular base station 650 through an RF receiving unit embedded therein using one or more RF antennas/transceivers such as an RF antenna 15. First transmission module 100*a* enables receiving at least part of the data arriving from cellular base station 650 (e.g. by connecting to the cellular modem and a SIM card of station device 61) and potentially modifying some of the received data such as audio data that relates to phone calls' voice data into ultrasonic signals for transmitting the ultrasonic signals to second receiving module 200*b* of interfacing module 62 through ultrasonic link 99.

Second transmission module 100*b* modifies the audio signals that are picked up by the cellular phone into an ultrasonic signals and transmits them over ultrasonic link 99 to first receiving module 200*a* that is included inside station device 61. Station device 61 transforms the ultrasonic signal into an RF signal to be transmitted over RF link 98 to cellular base station 650. Second receiving module 200*b* enables receiving the ultrasonic signals from transmission data 100, decoding and demodulating the signals for recovering of the audio signals and outputting the recovered audio signals through mobile device 10. This allows turning mobile phone 10 to a communication device that does not require/use electromagnetic based communication while still allowing the user to enjoy its functionalities by using it for conducting phone calls, receiving messages and the like. This configuration further allows avoiding the harmful electromagnetic radiation emitted by mobile phone 10 when used without system 300' by using ultrasonic communication for at least most of the usage duration (e.g. conducting of a phone call and the like).

Station device 61 may be located at a fairly sufficient distance from interfacing module 62/mobile phone 10 yet at a short enough range for establishing high quality and noise robust ultrasonic communication. Interfacing module 62 may interface/connect with/to mobile phone 10 through any interfacing technology and/or device such as, for instance, through an audio connection, USB connection 65 and the like.

According to some embodiments, station device 61 and interfacing module 62 may additionally allow bidirectional low RF communication therebetween. The low RF communication may be carried out as explained above, by additional receiving/transmission RF units 102*a/b* and 202*a/b* to each module 100*a/b* and 200*a/b*, respectively.

Second receiving module 200*b* and transmission module 100*b* may be embedded in mobile phone 10 without requiring an interfacing module to execute their functions and operations. Alternatively, when using mobile devices that do not include second receiving and transmission modules 200*b* and 100*b* embedded therein, interfacing module 62 may be designed and configured as a jacket device into which mobile phone 10 can be fitted designed as a phone back-cover, which may also serve as a securing jacket for preventing the device from damaging when dropped, and the like.

According to some embodiments of the present invention, interfacing module 62 may enable connecting to a USB or an audio (wired headset) connection of mobile phone 10 and thereby inputting and outputting data. This means that at least some of the data included in the demodulated ultrasonic signals may be outputted by receiving module 200*a* as data packet digitally transferred to mobile phone 10 or as an analog audio output routed to the mobile phone audio through the audio connector, where mobile phone 10 translates this data into the output presentation thereof such as audio signals, text messages and/or any other data representation enabled thereby. In case the data relates to voice data of phone calls, audio signals may be outputted by audio output device(s) of mobile phone 10 such as through speaker 11. Similarly, the audio signals that are sensed by the mobile phone microphone 12 may be transmitted through the USB or the audio connection to interfacing module 62 for the purpose of ultrasonic or RF modulation towards station device 61. The jacket design of interfacing module 62 allows the user to use mobile phone 10 (when fitted therein) in a typical and ordinary manner for conducting phone calls, receiving text messages etc.

According to some embodiments of the present invention, mobile phone 10 and station device 61 periodically try to create a low power RF/Ultrasonic connection by monitoring the received signal to look for activity in potential channels of the available spectrum. When such a low power connection is established, it works in a very low duty cycle condition (in which once every 0.5 Sec mobile phone 10 and station device 61 communicate very short control messages therebetween). Once mobile phone 10 and station device 61 detect the possibility of a good connection (i.e.: they are within a predefined reception range), system 300' controls and manages all communication between mobile phone 10 and cellular base station 650.

According to some embodiments, when an incoming or outgoing call is requested, then a higher rate ultra-sonic link is created to rout the audio signals between mobile device 10 (via interfacing module 62) and station device 61. The audio signals are routed from a microphone(s) and speaker(s) of each of station device 61 and mobile phone 10 through the ultrasonic link. Thus no endangering electromagnetic radiation (such as RF radiation) is emitted in proximity to the head/body of the user when conducting phone calls and/or messaging), while still using a regular mobile phone 10 for conducting these operations without having to buy or switch to a completely different device type.

According to some embodiments, once a phone call is ended, station device 61 may disconnect/disable the ultrasonic link (e.g. into a periodic "sniff" intervals in which conditions for reestablishing ultrasonic communication are checked every period automatically by station device 61). Once an incoming/outgoing call is created between the mobile phone 10 and station device 61, station device 61 detects the presence of a call, for example, by sensing an RF output through a car-kit connector or by mobile phone 10 SW or by sensing a presence of audio activity or by a combination thereof, etc. Station device 61 may enable initiating communication with interfacing module 62. Once communication is initiated, station device 61 may establish and/or maintain the ultrasonic communication.

According to some embodiments, mobile phone 10 may initiate phone calls directly with cellular base station 650 via an RF link. In this case, module 65 can communicate with station 61 and request that the call will be routed via the ultrasonic link. In order for the call to be routed without disconnecting and in a "seamless" way to the user, station device 61 may create another second voice call cellular connection with cellular base station 650 to the same end destination which gets a message of another phone call is waiting and accepts this (thus another voice path is opened). When the other call has been established, the mobile phone 10 routes the input and output audio via interface device 62 through ultrasonic link 99 into cellular base station 650 via station 61, while the first cellular call is disconnected. This allows an automatic establishment of a call even if it was originated by the mobile phone to cellular base station 650.

According to some embodiments of the present invention, any of the transmission modules described above may additionally be able allocating ultrasonic frequency bands to each received input signals according to environmental or internal communication conditions. To do that, the transmission module also enables checking ultrasonic transmission conditions that may be either environmental, internal, or both. For example, the transmission module may check whether other users and/or devices in the close environment thereto are using ultrasonic communication and if so what band(s) (frequency range(s)) are already taken. In this case, the transmission module allocates other frequency bands for transmission to avoid interference between the ultrasonic signals it outputs and the ones others are using in the close environment.

Figure 8:
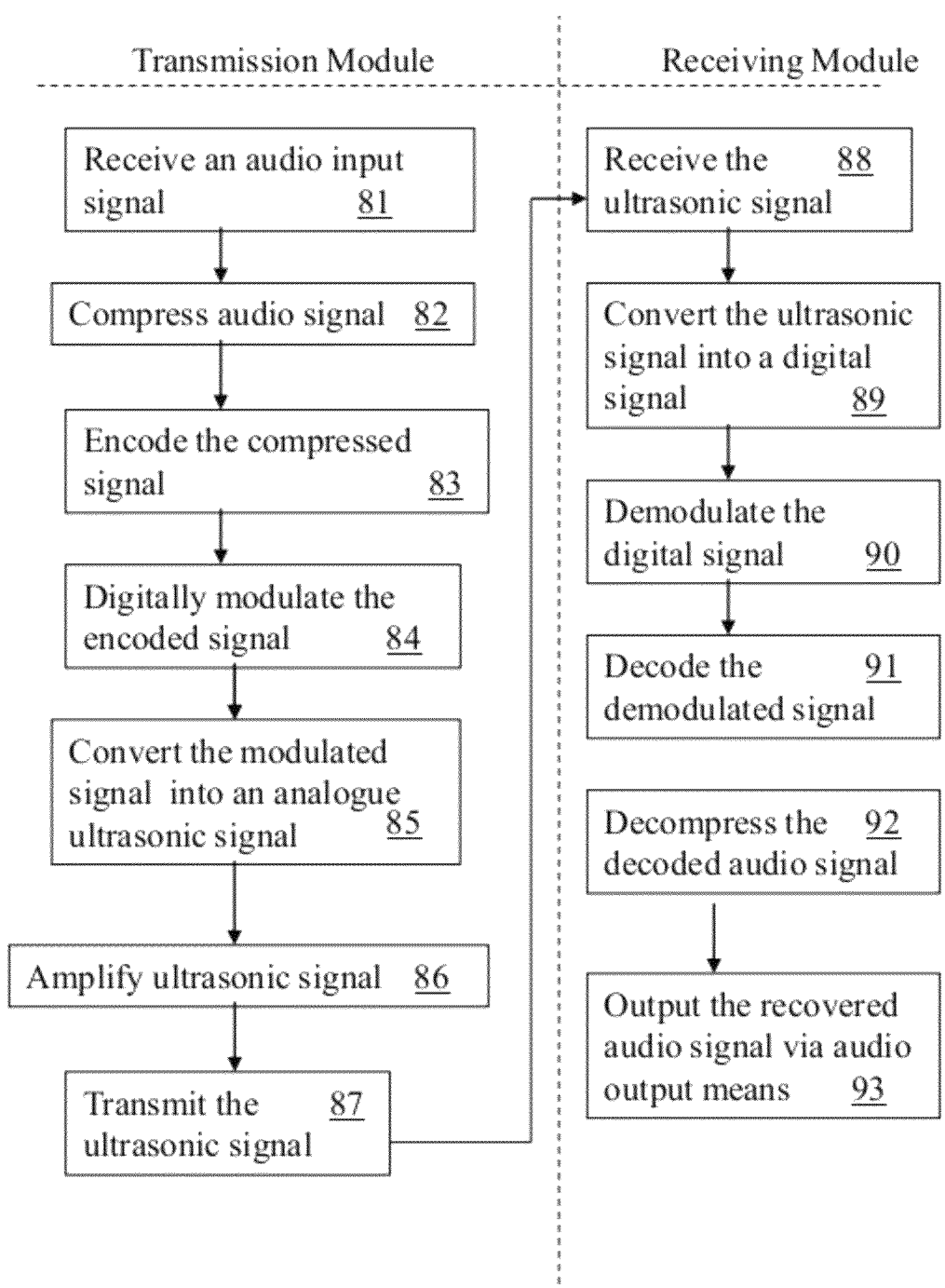
FIG. 8 is a flowchart, schematically illustrating a process of ultrasonic communication using the system of FIG. 1, according to some embodiments of the present invention.

Reference is now made to FIG. 8, which is a flowchart schematically illustrating a process of ultrasonic communication between the transmission module and the receiving module. According to this process, the transmission module receives an audio input signal 81 via one or more receivers such as via a microphone and modifies the received audio signal according to one or more modification techniques and according to various conditions that will ultimately result in a corresponding ultrasonic signal. As illustrated in FIG. 8, the modification may include: compressing the input audio signal 82, encoding the compressed signal 83 resulting in an encoded and compressed audio signal at this stage. The encoded audio signal may then be digitally modulated 84 according to one or more modulation techniques such as single-carrier and/or multicarrier modulation i.e. OFDMA, or CDMA modulations. This stage will result in a digital signal representing the input audio signal. The digital signal may then be converted into an analog ultrasonic signal 85 fed to a transducer of the transmission module for outputting the ultrasonic signal 87. The transmission of the ultrasonic signals may be carried out, as specified above, by one or more acoustic output devices that can output ultrasonic signals such as speakers piezoelectric devices and the like. These devices may be included as part of the transmission module or be external to it (e.g. speaker of the wireless device associated with the transmission module). The ultrasonic analog signal may be amplified 86 prior to transmission thereof by an amplifier of the transmission module.

The transmitted ultrasonic signal may be received (detected) at the receiving module 88, which may then recover the original input audio signal therefrom at an accuracy that depends on communication quality and conditions as well as the system's components and configuration. The recovery of the audio input signal may include, as illustrated in FIG. 8, converting the ultrasonic analog signal into a digital signal 89, demodulating the digital signal 90 according to the modulation techniques used for modulation of the original input signal (e.g. using reversed FMDMA or reversed CDMA). The resulting signal may be a recovered decoded and compressed audio signal, which may then be decoded 91 and decompressed 92 for recovering the original audio signal thereby. The recovered audio signal can then be outputted 93 by an integral or a separate audio output device such as a speaker, a headset etc.

Figure 9:
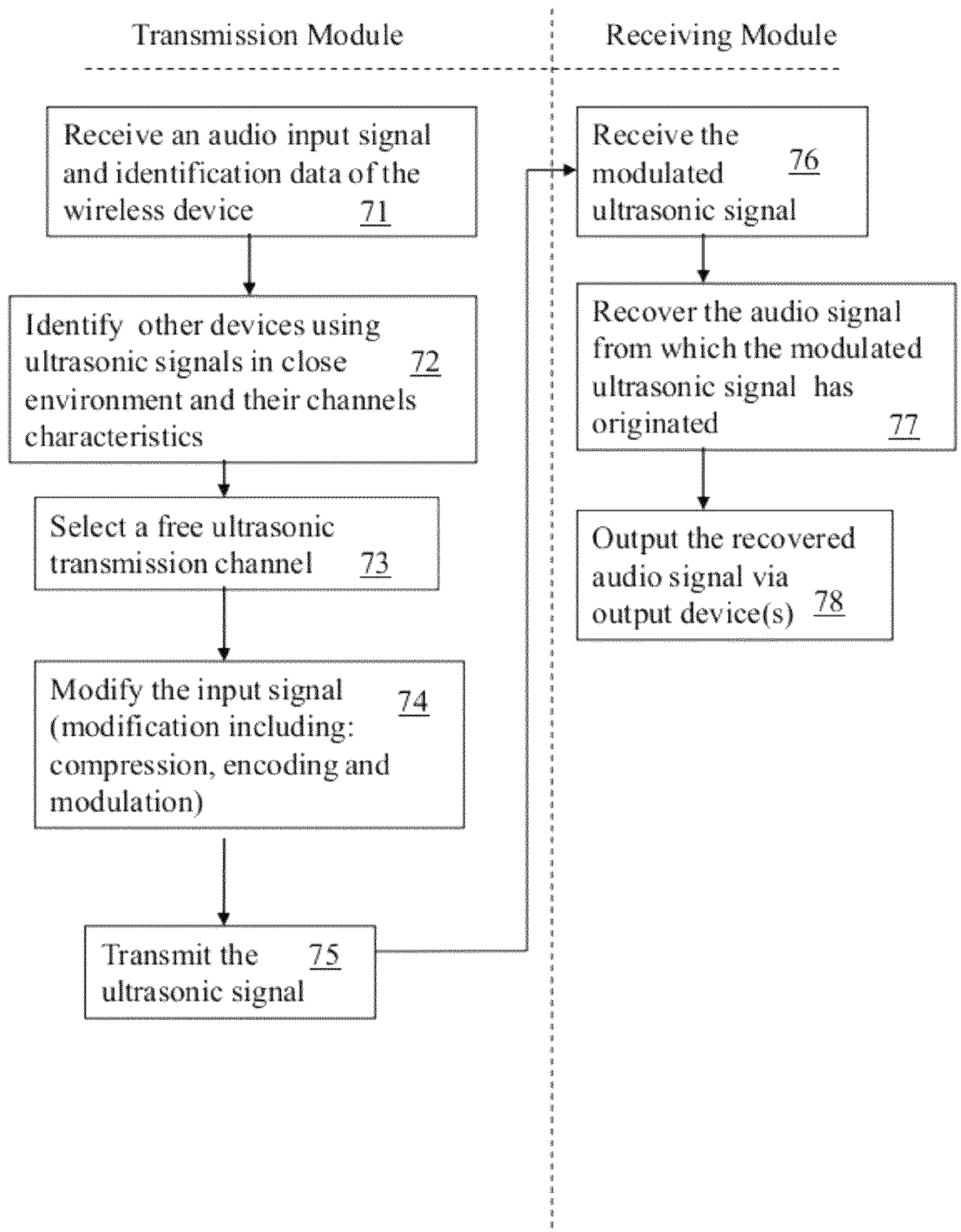
FIG. 9 is a flowchart, schematically illustrating a process of ultrasonic communication using the system of FIG. 1, according to some embodiments of the present invention.

Reference is now made to FIG. 9, which is a flowchart schematically illustrating a process of ultrasonic communication, according to additional or alternative embodiments of the present invention. This process includes the steps of receiving the audio signal 71 and checking whether other system are using ultrasonic communication in the close environment to the system that may interfere the system's ultrasonic communication. If such other ultrasonic communication is detected 72 the transmission module may check the frequency band(s) used by these other systems and select or define a free ultrasonic communication channel accordingly 73. The system may require the width of the selected/defined ultrasonic channel to be of a single predefined width or define a minimum band width threshold to avoid losing information of the input signal due to narrowing of the ultrasonic channel band. The band or channel defines the ultrasonic frequency range of each ultrasonic signal or each group of ultrasonic signals of a particular time period corresponding to environmental interferences.

Once the channel is selected 73 or during the selection thereof, the transmission module modifies the audio input signal 74, according to the selected signal and the one or more predefined modification techniques (e.g. as described in steps 82-85 or 82-86 of FIG. 8). The resulting ultrasonic signal is then transmitted via the one or more ultrasonic output devices 75 and picked by the receiving module 76, which recovers the original audio input signal therefrom 77 (e.g. in the same way as described in steps 88-91 of FIG. 8 or in according to any other recovery technique). The recovered audio signal is then outputted via one or more output devices 78.

Figure 10:
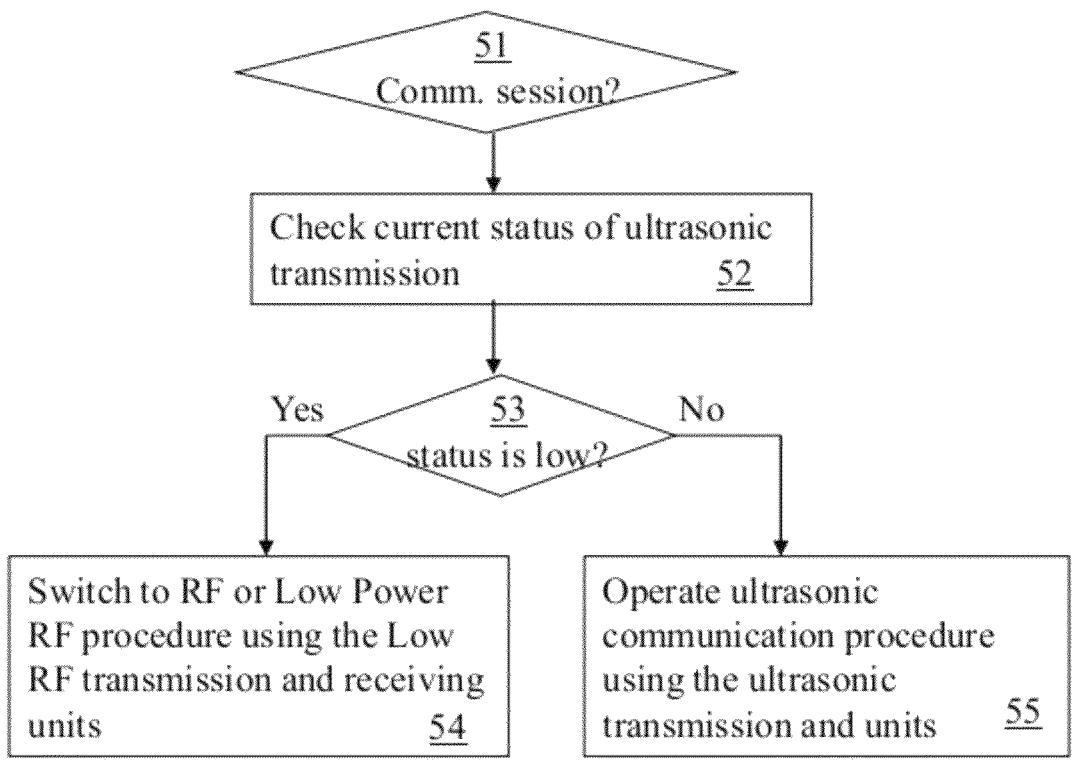
FIG. 10 is a flowchart schematically illustrating a process for enabling dual-mode communication, according to some embodiments of the present invention.

Reference is now made to FIG. 10, which is a flowchart schematically illustrating a process for enabling dual-mode communication, according to some embodiments of the present invention. In these embodiments, as mentioned in the above description, the system enables checking a current status of the ultrasonic communication or transmission 52 in each communication session 51 or at every predefined period. If the communication status exceeds a predefined threshold, which means that the system confirms a sufficient quality of ultrasonic communication—then the communication between the transmission module and the receiving module will be carried out using the ultrasonic link 55. If the ultrasonic communication status is lower than the threshold then the system enables switching to a fallback low RF communication enabled thereby 54.

In the latter case, the transmission module enables converting each received audio signal into an RF signal according to one or more predefined RF modification techniques and receiving module enables receiving those RF signals and recovering the original audio signals therefrom. The low RF signals may be within a predefined low range of the RF spectrum emitting a much less harmful electromagnetic radiation than that used in regular wireless communication for still being able to reduce the radiation exposure impact on the user.

The system may revert back to the ultrasonic communication once the status is high enough again. To do that the system is required to check the ultrasonic communication status at predefined time intervals.

Figure 11:
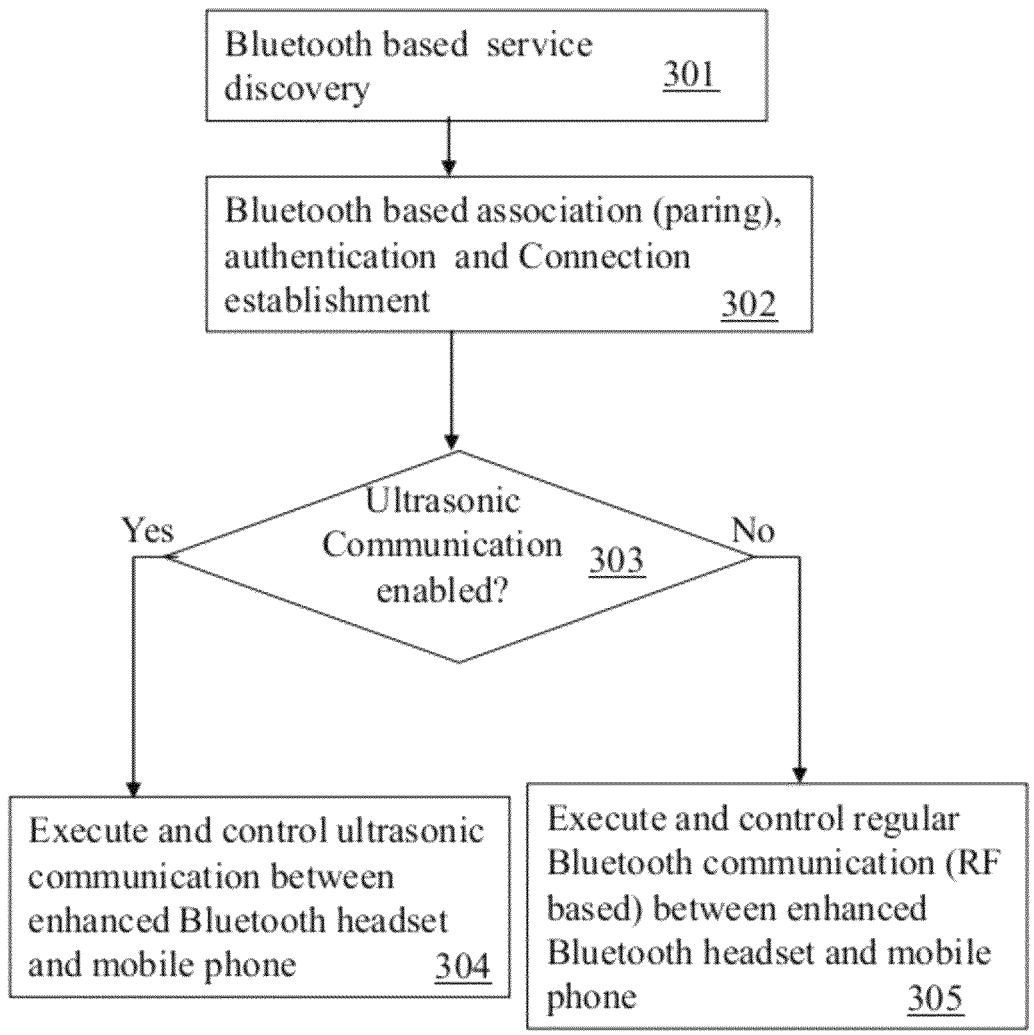
FIG. 11 is a flowchart schematically illustrating a process of using a Bluetooth based headset enabling both Bluetooth based communication as well as ultrasonic communication, according to some embodiments of the present invention.

Reference is now made to FIG. 11, which is a flowchart schematically illustrating a process of using a Bluetooth based headset enabling both Bluetooth based communication as well as ultrasonic communication, according to some embodiments of the present invention. According to these embodiments, an enhanced Bluetooth based headset may be used including all known in the art Bluetooth based headset components and functionalities for using Bluetooth protocols for communicating wirelessly with a mobile phone or any other device such as a Smartphone, a laptop, a media player and the like, having an additional transmission module and/or receiving module embedded therein and another control module for allowing controlling the Bluetooth based and ultrasonic communication thereby. For example, the control module may enable Bluetooth based service discovery 301 for identifying an associated remote wireless device (e.g. mobile phone, music player etc.) and services required/provided thereby and for establishing, pairing, authenticating and optionally maintaining communication with the wireless device 302. Once communication with the remote wireless device is established and authenticated, the control module may check if an ultrasonic communication between the headset and remote wireless device is enabled. This check may include: (1) checking whether the earphone of the headset supports receiving ultrasonic signals and recovering their corresponding audio signals for outputting thereof; (2) supports receiving of audio signals converting them into ultrasonic signals for transmission thereof; and/or (3) checking whether the wireless device enables receiving and/or transmitting of ultrasonic signals. Additionally or alternatively, the control module may further check other technical conditions for maintaining an ultrasonic communication such as ultrasonic local interferences (e.g. signal to noise ratio) and the like.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims. In addition, "present invention" as used throughout this disclosure is intended to refer to an embodiment of the invention, and is not intended in any sense to limit the invention to a specific implementation.

The invention claimed is:

1. A system for wireless communication using ultrasonic signals, said system comprising:
   at least one transmission module configured to
      receive input signals from at least one predefined wireless device and
      modify said received input signals to produce a modification of said received input signals,
         wherein said modification of said received input signals comprises signal modulation, and signal securing by signal encoding and signal error correction to produce secured signals,
         wherein said signal modulation comprises converting the secured signals into corresponding ultrasonic signals, and
      wirelessly transmit said ultrasonic signals over an ultrasonic communications link;
   at least one receiving module configured to
      receive the transmitted ultrasonic signals and recover their corresponding input signals from said respective ultrasonic signals by decoding, error-correction decoding and demodulation of the received ultrasonic signals, and output each of the recovered input signals through at least one output device;
wherein said at least one transmission module is further configured to transmit signals over at least one RF link to said at least one receiving module that is configured to receive said signals over said at least one RF link;
wherein said at least one transmission module comprises
an ultrasonic transmission unit configured to receive said input signals, and perform modification and conversion thereof into the ultrasonic signals and transmit the ultrasonic signals;
an RF transmission unit configured to receive and modify the input signals in a manner that enables conversion of each received input signal into an RF signal and transmission of each said RF signal over said at least one RF link;
a module configured to identify a current ultrasonic communication link status, wherein upon identification of a low communication status, said at least one transmission module is configured to operate said RF transmission unit and use RF communication when the ultrasonic communication link is poor; and,
wherein said at least one receiving module comprises
an ultrasonic receiving unit configured to receive transmitted ultrasonic signals and extract said input signals associated therewith and output said input signals; and
an RF receiving unit, configured to receive transmitted RF signals and extract input signals associated therewith and output said input signals.

2. The system according to claim 1, wherein said input signals are audio signals.

3. The system according to claim 2,
wherein said wireless device comprises at least one audio transmitter and
wherein said at least one transmission module is operatively associated with said at least one audio transmitter of said wireless device and is configured to receive said audio input signals, and
wherein said at least one receiving module is operatively associated with said at least one audio output device that is configured to output said audio signals.

4. The system according to claim 1, wherein said transmission module comprises:
a data encoder configured to compress and encode said input signal;
a modulator, connected to said data encoder, configured to digitally modulate the encoded signal outputted by said data encoder, according to a predefined modulation technique;
at least one digital to analog converter, connected to said modulator, configured to convert the digitally modulated signal into an analog ultrasonic signal; and
an output unit, connected to the at least one digital to analog converter, configured to transmit the ultrasonic signal wirelessly,
wherein said receiving module comprises:
a receiver configured to sense ultrasonic signals;
an analog to digital converter connected to said receiver configured to convert each received ultrasonic signal into a corresponding digital signal;
a demodulator configured to demodulate digital signals output by said analog to digital converter;
a data decoder, connected to said demodulator, configured to decode and decompress each digital signal to obtain a decoded signal corresponding to a respective said input signal associated therewith; and
an output device, configured to output the recovered corresponding signals.

5. The system according to claim 4,
wherein said output unit comprises at least one of:
a speaker and/or a piezoelectric device configured to output ultrasonic signals, and
and wherein said receiver comprises at least one of:
a microphone and/or
a detector configured to detect ultrasonic signals.

6. The system according to claim 4, wherein said modulation technique includes at least one of: single-carrier modulation, multicarrier modulation, OFDMA modulation, and CDMA modulation, wherein said error correction comprises forward error correction (FEC) and said encoding further comprises scrambling based techniques and/or data interleaving based technique.

7. The system according to claim 1, wherein at least part of said modification of said input signals is configured to be carried out by a software application operated by said wireless device.

8. The system according to claim 1, wherein a wireless headset is operatively associated with a first transmission module and a wireless mobile device is operatively associated with a second receiving module configured to use said ultrasonic communication between said wireless headset and mobile wireless device to transmit and receive data using said RF communication or said ultrasonic communication that transmits data from said wireless mobile device to said wireless headset and said ultrasonic communication that transmits data from said wireless headset to said wireless mobile device.

9. The system of claim 8, wherein said headset is based on wireless technology and wherein said first transmission and second receiving modules are embedded therein, wherein the wireless link performs service discovery and connection establishment and maintenance, using wireless protocols.

10. The system according to claim 1, wherein said transmission module is further configured to receive modulated RF input signals that carry data over a long range RF link from at least one wireless communication network station, modify said received input signals to output and transmit corresponding ultrasonic signals to said receiving module, and said receiving module is operatively associated with a mobile wireless device configured to receive said ultrasonic signals or said RF signals from said transmission module and use data output abilities of said mobile wireless device to output data corresponding to said input signals.

11. The system according to claim 10, further comprising an interfacing device configured to connect to said receiving module and to said mobile wireless device interfacing them to one another.

12. The system according to claim 1, wherein said receiving module is connected to a wireless headset and wherein said transmission module is further configured to output data over said RF link while outputting said ultrasonic signals to enable establishing, authenticating and maintaining communication with said wireless headset via said RF link and output audio signals corresponding to said input signals via at least one audio output device of said wireless headset.

13. The system according to claim 12, wherein said wireless headset is a wireless based headset and wherein said receiving module is embedded in said wireless headset.

14. The system according to claim 1, wherein said wireless communication device includes at least one of: a personal digital assistance (PDA) device, a laptop, a tablet computer, a cellular phone, a cellular Smartphone, or a cellular modem, and said output device comprises at least one of: a wireless headset, a wireless speaker.

15. A method of wireless communication using ultrasonic signals, said method comprising:
receiving input signals from at least one predefined wireless device, using at least one transmission module;
securing said received input signals by encoding, error-correction and modulating said received input signals by converting said received input signal into corresponding ultrasonic signals;
wirelessly transmitting the ultrasonic signals over an ultrasonic communications link;
receiving the transmitted ultrasonic signals as received ultrasonic signals, using at least one receiving module;
recovering input signals from said received ultrasonic signals that correspond thereto by decoding and demodulating the received ultrasonic signals;
outputting each of said respective input signal through an output device;
wherein said at least one transmission module is further configured to transmit signals over at least one RF link to said at least one receiving module that is configured to receive said signals over said at least one RF link;
wherein said at least one transmission module comprises
an ultrasonic transmission unit configured to receive said input signals, and perform modification and conversion thereof into the ultrasonic signals and transmission of the ultrasonic signals;
an RF transmission unit configured to receive and modify the input signals in a manner that enables conversion of each received input signal into an RF signal and transmission of each said RF signal over said at least one RF link;
a module configured to identify a current ultrasonic communication link status, wherein upon identification of a low communication status, said at least one transmission module is configured to operate said RF transmission unit and use RF communication when the ultrasonic communication link is poor; and,
wherein said at least one receiving module comprises
an ultrasonic receiving unit configured to receive transmitted ultrasonic signals and extract said input signals associated therewith and output said input signals; and
an RF receiving unit, configured to receive transmitted RF signals and extract input signals associated therewith and output said input signals.

16. The method of claim 15, wherein said modulating includes single-carrier or multicarrier or CDMA modulation.

17. The method of claim 15, wherein said input signals are audio signals output by at least one audio device of said wireless device, and wherein the recovered audio input signals are output by another audio output device.

18. A system for wireless communication using ultrasonic signals, said system comprising:
a first and a second transmission modules each configured to receive input signals from at least one predefined wireless communication link, modify said received input signals to produce a modification of said received input signals, convert the received input signals into corresponding ultrasonic signals, said modification comprising signal modulation and signal securing by signal encoding and signal error-correction, and wirelessly transmit each said ultrasonic signal over an ultrasonic link;
a first and a second receiving modules, each configured to receive the transmitted ultrasonic signals, recover the corresponding input signals from said respective ultrasonic signals and output each said respective input signal, wherein said recover is configured to decode and demodulate said encoded and modulated received ultrasonic signals and convert said received ultrasonic signals into their corresponding input signals;
a station device comprising said first transmission and receiving modules, said station device enables receiving ultrasonic signals from an ultrasonic communications link and convert the received signals to long range RF signals and transmit the RF output signals to at least one remote cellular base station;
an interfacing module, which is operatively associated with a wireless device, said interfacing module comprises said second transmission and receiving module that is configured to bidirectionally communicate between said station device and said wireless device associated therewith over said ultrasonic communications link;
wherein said first and second transmission modules are further configured to transmit signals over at least one RF link to said first and second receiving modules, and wherein said first and second receiving modules, respectively are configured to receive said signals over said at least one RF link;
wherein said first and second transmission modules comprise
an ultrasonic transmission unit configured to receive the input signals, and perform modification and conversion thereof into ultrasonic signals and transmit the ultrasonic signals;
an RF transmission unit configured to receive and modify the input signals in a manner that enables conversion of each received input signal into an RF signal and transmission of each said RF signal over said at least one RF link;
a module configured to identify a current ultrasonic communication link status, wherein upon identification of a low communication status, said first and second transmission modules are configured to operate said RF transmission unit and use RF communication when the ultrasonic communication link is poor; and,
wherein said first and second receiving modules comprise
an ultrasonic receiving unit configured to receive transmitted ultrasonic signals and extract input signals associated therewith and output said input signals; and
an RF receiving unit, configured to receive transmitted RF signals and extract input signals associated therewith and output said input signals.

19. The system according to claim 18, wherein said wireless device is a mobile phone and wherein said interfacing module is embedded within said mobile phone.

20. The system according to claim 18, wherein said wireless device is a mobile phone and wherein said interfacing module is a separate device connecting to said mobile phone.

21. A system for wireless communication using ultrasonic signals, said system comprising:
at least one transmission module configured to
receive input signals from at least one predefined wireless device wherein said input signals are audio signals and
modify said received input signals to produce a modification of said received input signals, wherein said modification of said received input signals comprises signal modulation, and signal securing by signal encoding and signal error correction to produce secured signals,
wherein said signal modulation comprises converting the secured signals into corresponding ultrasonic signals,
wherein at least part of said modification of said input signals is configured to be carried out by a software application operated by said wireless device and
wirelessly transmit said ultrasonic signals over an ultrasonic communications links;
at least one receiving module configured to
receive the transmitted ultrasonic signals and recover their corresponding input signals from said respective ultrasonic signals by decoding, error-correction decoding and demodulation of the received ultrasonic signals, and
output each of the recovered input signals through at least one output device;
wherein said transmission module comprises:
an ultrasonic transmission unit configured to receive input signals, and perform modification and conversion thereof into ultrasonic signals and transmit the ultrasonic signals;
an RF transmission unit configured to receive and modify input signals in a manner that enables conversion of each received input signal into an RF signal and transmission of each said RF signal over said RF link;
a module configured to identify a current ultrasonic communication link status, wherein upon identification of a low communication status, said at least one transmission module is configured to operate said RF transmission unit for using RF communication when the ultrasonic communication link is poor, and
wherein said at least one receiving module comprises:
an ultrasonic receiving unit configured to receive transmitted ultrasonic signals and extract input signals associated therewith for outputting of said input signals; and
an RF receiving unit, configured to receive transmitted RF signals and extracting input signals associated therewith for outputting of said input signals.

22. A method of wireless communication using ultrasonic signals, said method comprising:
receiving input signals from at least one predefined wireless device, using at least one transmission module;
securing said received input signals by encoding, error-correction and modulating said received input signals by converting said received input signal into corresponding ultrasonic signals wherein said modulating includes single-carrier or multicarrier or CDMA modulation;
wirelessly transmitting the ultrasonic signals over an ultrasonic communications link;
receiving the transmitted ultrasonic signals as received ultrasonic signals, using at least one receiving module;
recovering input signals from said received ultrasonic signals that correspond thereto by decoding and demodulating the received ultrasonic signals;
outputting each of said respective input signal through an output device;
identifying a current ultrasonic communication link status; and
upon identification of a low ultrasonic communication link status, operating an RF transmission unit and said receiving module for using RF communication to replace the ultrasonic communication link;
wherein said at least one transmission module is further configured to transmit signals over at least one RF link to said at least one receiving module that is configured to receive said signals over said at least one RF link;
wherein said at least one transmission module comprises
an ultrasonic transmission unit configured to receive said input signals, and perform modification and conversion thereof into the ultrasonic signals and transmission of the ultrasonic signals;
an RF transmission unit configured to receive and modify the input signals in a manner that enables conversion of each received input signal into an RF signal and transmission of each said RF signal over said at least one RF link;
a module configured to identify a current ultrasonic communication link status, wherein upon identification of a low communication status, said at least one transmission module is configured to operate said RF transmission unit and use RF communication when the ultrasonic communication link is poor; and,
wherein said at least one receiving module comprises
an ultrasonic receiving unit configured to receive transmitted ultrasonic signals and extract said input signals associated therewith and output said input signals; and
an RF receiving unit, configured to receive transmitted RF signals and extract input signals associated therewith and output said input signals.

* * * * *